UNITED STATES PATENT OFFICE.

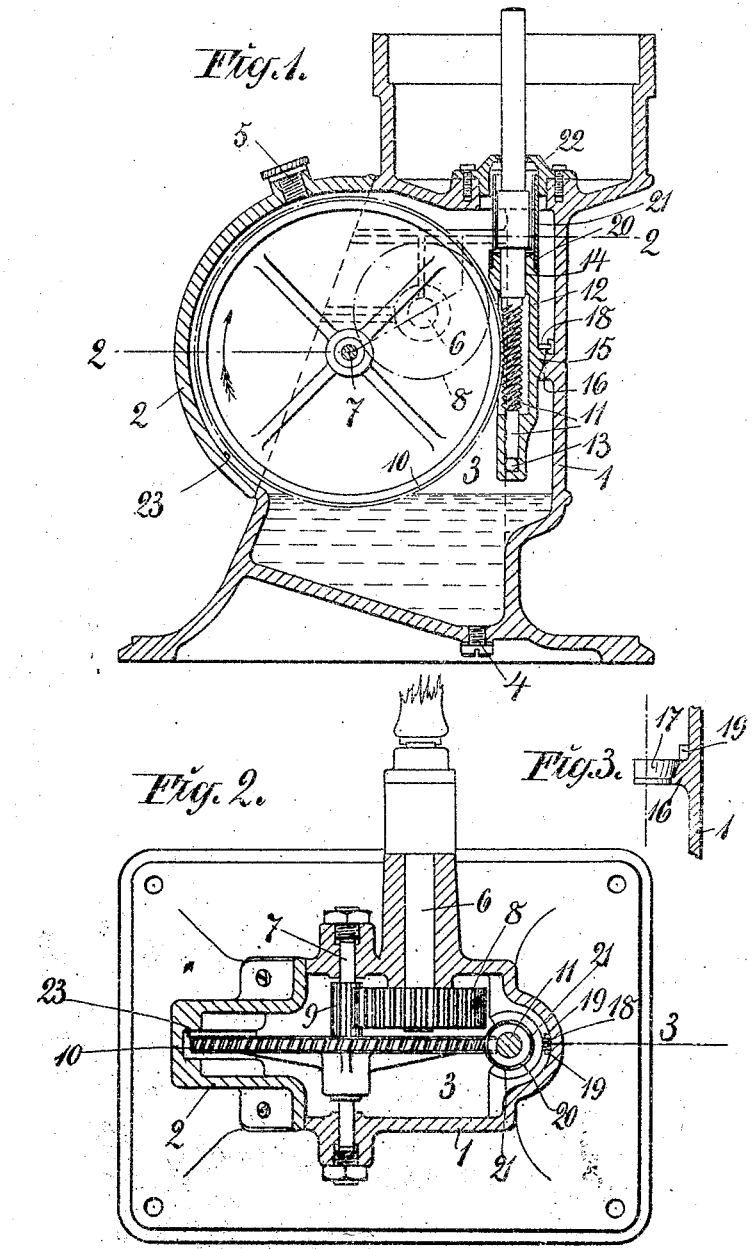

JOHANNES VALDEMAR MÅRTÉN RISBERG, OF FRIDHEM, SÖDERTELJE, SWEDEN, ASSIGNOR TO AKTIEBOLAGET BALTIC, OF SÖDERTELJE, SWEDEN, A CORPORATION OF SWEDEN.

LUBRICATOR FOR CENTRIFUGAL LIQUID-SEPARATORS.

1,054,988.  Specification of Letters Patent.  Patented Mar. 4, 1913.

Application filed December 23, 1911. Serial No. 667,512.

*To all whom it may concern:*

Be it known that I, JOHANNES VALDEMAR MÅRTÉN RISBERG, a subject of the King of Sweden, and resident of Fridhem, Södertelje, in the Kingdom of Sweden, have invented certain new and useful Improvements in Lubricators for Centrifugal Liquid-Separators, of which the following is a specification, reference being had therein to the accompanying drawing.

In order to effect a reliable lubrication of the driving gear and its bearings in centrifugal liquid separators actuated manually, for instance by means of a worm gear, the worm wheel of the said gear generally runs in an oil receptacle provided in the bottom part of the frame of the separator, or oil has been led directly to the periphery of the said wheel from an oil cup. If a sufficiently great quantity of oil is supplied to the worm wheel in the said manner, it is distributed to the whole chamber of the said frame as a drizzle owing to the great velocity of the wheel.

The object of this invention is to arrange the separators in such manner, that also the neck bearing of the spindle, carrying the centrifugal drum, is lubricated automatically, so that all bearings of the apparatus are lubricated automatically. For that reason the separators are so arranged, that the said neck bearing is located inside the oil chamber, so that it is struck directly by oil thrown about.

A further object of the invention is to so arrange the said bearing that the spindle can oscillate to some extent in order to be centered during the rotary movement of the drum.

Figure 1 of the accompanying drawing is a vertical section of a manually actuated centrifugal liquid separator arranged in accordance with this invention; the centrifugal drum is omitted. Fig. 2 is a section on the line 2—2 of Fig. 1. Fig. 3 is a detail section on the line 3 of Fig. 2.

1 is the frame of the apparatus and 2 is the protecting hood, forming together a closed chamber 3, in which the driving gear is provided. The bottom part of the frame forms an oil receptacle. The oil in the said receptacle can be drawn off through an opening closed by a screw plug 4, while oil can be supplied to the receptacle through an opening in the top part of the protecting hood, closed by a screw plug 5.

The driving gear consists of a horizontal shaft 6, which is provided with a crank and a cylindrical toothed wheel 8, engaging a pinion 9. The said pinion 9 and a worm wheel 10 are fixed to a horizontal shaft 7, and the said worm wheel engages screw threads provided on the spindle 11 of the centrifugal drum (not shown). The said spindle 11 is journaled in a sleeve 12, in the lower closed part of which a ball 13 is located, supporting the spindle 11. The top part of the sleeve 12 forms the neck bearing 14 of the spindle. The sleeve 12 is located at such a level in the chamber 3, that there is a space between its top end and the inner top side of the said chamber.

In order to permit the sleeve 12 and the spindle 11 to oscillate to a certain extent, so that the spindle can be centered during the rotary movement of the drum, the sleeve 12 has a swell 15 forming a part of a sphere. From the side wall of the chamber 3 a shelf 16 projects inward and is provided with a recess 17, which is cup shaped in accordance with the shape of the swell 15. The sleeve 12 is located with its swell 15 in the said recess as shown. The center point of the sphere is located on a horizontal line drawn through the center of the shaft 7 and the center of the spindle 11. Owing to the described arrangement the sleeve 12 and the spindle 11 can oscillate to some extent in all directions. In order to prevent the sleeve 12 from rotating with the spindle 11, a pin 18, fixed in the sleeve, extends into the space between two lugs 19, 19, provided on the side wall of the chamber 3. A ring 20, provided with upward extending tongues 21, is slid on the top end of the sleeve 12. The free ends of the said tongues bear against a cap 22, fixed to the frame. The said ring and tongues are adapted to support the sleeve 12 in a yielding manner, but may be dispensed with.

In the inner side of the hood 2 is a groove or channel 23 is provided, which incloses rather tightly the worm wheel 10, in order that a great quantity of oil may accompany the wheel upward, when rotated in the direction indicated by the arrow.

During the operation of the apparatus the worm wheel 10 rotates at a rather great velocity, about 500 to 600 revolutions per minute, in the direction indicated by the arrow and carries with it upward through the channel 23 a heavy current of oil from the receptacle provided in the bottom part of the frame, so that the said wheel acts like a wing wheel. As the oil is thrown out from the channel at the top part of the protecting hood, it is spread over the whole chamber 3 like a drizzle. A part of the said oil is caught by the neck bearing 14, from which it passes downward to the step bearing provided in the lower part of the sleeve 12. Another part of the said spread oil is caught by the wall of the sleeve 12, which also passes downward to the said step bearing. Also the contact surfaces between the swell 15 and the shelf 16 are lubricated by the spread oil. The oil caught by the wall of the chamber 3 passes into the pockets mentioned above and then to the bearings of the shafts 6 and 7, from which it passes to the oil receptacle in the bottom part of the frame, so that the oil circulates continuously.

Having now described my invention, what I claim as new and desire to secure by Letters Patent is:

In a centrifugal liquid separator, the combination of a closed chamber provided in the frame, a driving gearing located in the chamber, means for supplying lubricating oil to the periphery of a number of wheels of the said gearing, a sleeve located in the chamber, a ball joint connecting the sleeve with the frame, the said sleeve forming a step bearing and a neck bearing, a spindle adapted for carrying a centrifugal drum and located in the said bearings, the said neck bearing having a free situation in the said chamber and being located in the current of oil coming from the said wheels, so that its top part will receive the direct impact of the oil.

In witness whereof, I have hereunto signed my name in the presence of two subscribing witnesses.

JOHANNES VALDEMAR MÅRTEN RISBERG.

Witnesses:
META PRIM,
ROBERT APELGREN.